Sept. 13, 1955      E. G. PERRY, JR      2,717,821
SEISMOGRAPH TIMING DEVICES
Filed June 21, 1948      2 Sheets-Sheet 1
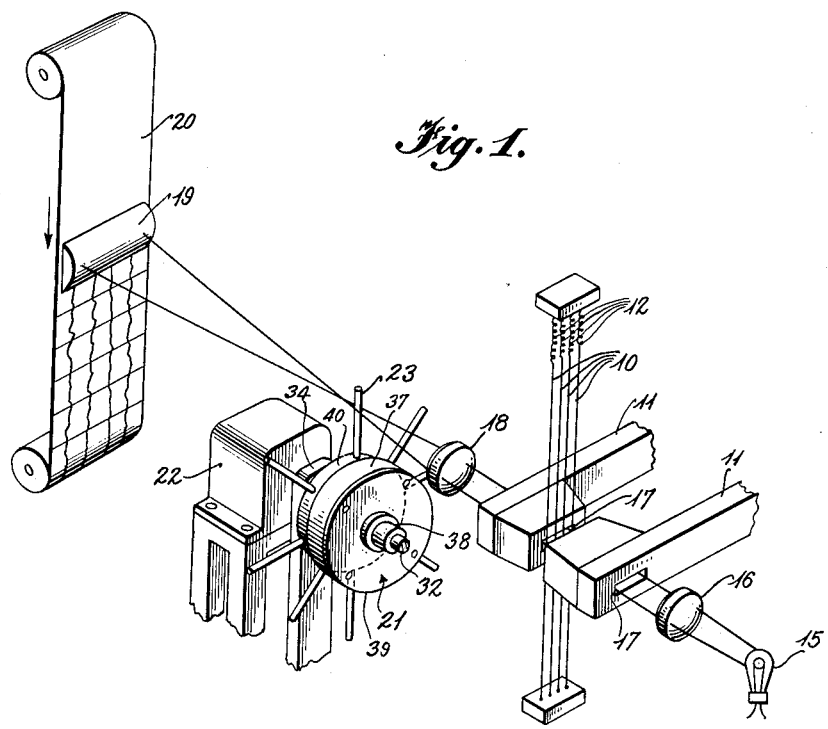
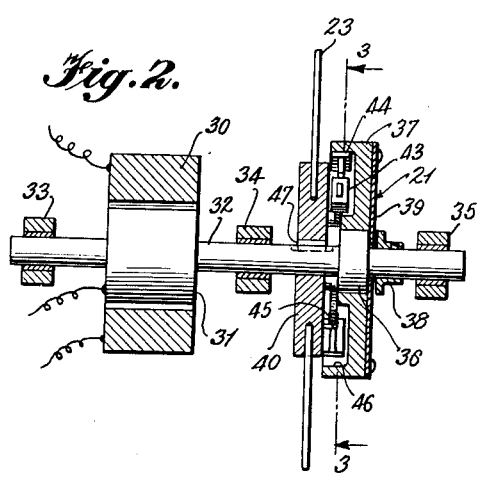
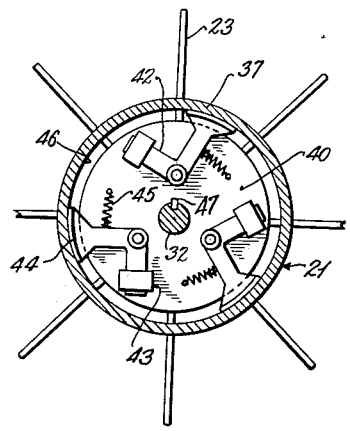
Inventor
E. Gordon Perry, Jr.
By Stevens, Davis, Miller and Mosher
Attorneys Sept. 13, 1955　　　　　E. G. PERRY, JR　　　　　2,717,821
SEISMOGRAPH TIMING DEVICES
Filed June 21, 1948　　　　　　　　　　　　　　2 Sheets-Sheet 2

Inventor
E. Gordon Perry, Jr.

By Stevens, Davis, Miller and Mosher
Attorneys

United States Patent Office 2,717,821
Patented Sept. 13, 1955

2,717,821

SEISMOGRAPH TIMING DEVICES

Edward Gordon Perry, Jr., Dallas, Tex., assignor to Texas Instruments Incorporated, a corporation of Delaware Application June 21, 1948, Serial No. 34,325

4 Claims. (Cl. 346—107)

This invention relates to the stabilization of the rate of angular displacement of the rotor of a motor or the like, and is more particularly related to apparatus for controlling and stabilizing the speed of synchronous timing motors of the type which are used with multiple oscillographs in the seismic prospecting art.

In seismic prospecting it is common to record simultaneously on a single photographic strip the output of a plurality of seismometers located in various positions in the area to be prospected. To this end the amplified output of each seismometer may be impressed on one of a group of string or mirror galvanometers arranged in parallel relationship. The group of strings or mirrors is located between a light source and a photographic tape so that the vibrations of the strings can be recorded photographically, as longitudinally extending traces, side by side, on a single tape. The photographic tape is, of course, driven at some controlled speed and, in order that the instant of arrival of the various impulses may be read from the tape record, it is customary to simultaneously record laterally extending timing lines on the moving strip of photographic paper. Either the same or another light source and a rotating shutter device having spokes or slats which periodically cause the formation of a line of either light or shadow extending across the tape, may be used for this purpose. The spacing between these lines is, of course, readable in time units and the lines are graphically associated with the traces from the string galvanometers for convenient analysis.

It is quite apparent that the accuracy of the application of the timing lines to the tape is very important to the accuracy of the record as a whole, and for this reason it has been common practice to drive the timing shutter from a motor of the synchronous type, operated from an alternating current electrical system of fixed frequency. While shutters operated by this arrangement have a very high average accuracy, it has been found that the accuracy of any particular seismic event may be inaccurate to a serious extent in view of the fact that the timing motors have a tendency to "hunt." Furthermore, difficulty has been encountered in the starting of these timing motors since the power from which they are driven is meager and it is necessary that they be spun at exactly the right speed in order for them to drop into synchronism.

It is an object of this invention to overcome the foregoing difficulties and to provide a shutter for use in the recording of wave signals which is characterized by a very high short interval accuracy as well as high average accuracy.

It is a further object of this invention to provide a timing motor of the synchronous type which is easy to start and which is characterized by freedom from "hunt" even when operated at low power.

It is contemplated according to this invention to improve the accuracy of time interval recording in multiple oscillograph apparatus of the type used in seismic prospecting.

Other objects and advantages of this invention will be apparent upon consideration of the following detailed description of a preferred embodiment thereof in conjunction with the annexed drawings, wherein:

Figure 1 is a perspective view of an oscillograph of the string galvanometer type including a timing shutter assembly constructed in accordance with the teachings of the present invention;

Figure 2 is a vertical sectional view of the timing shutter, the motor for driving the same, and the connection therebetween;

Figure 3 is a view partially in elevation and partially in section taken on the line 3—3 of Figure 2;

Figure 4:
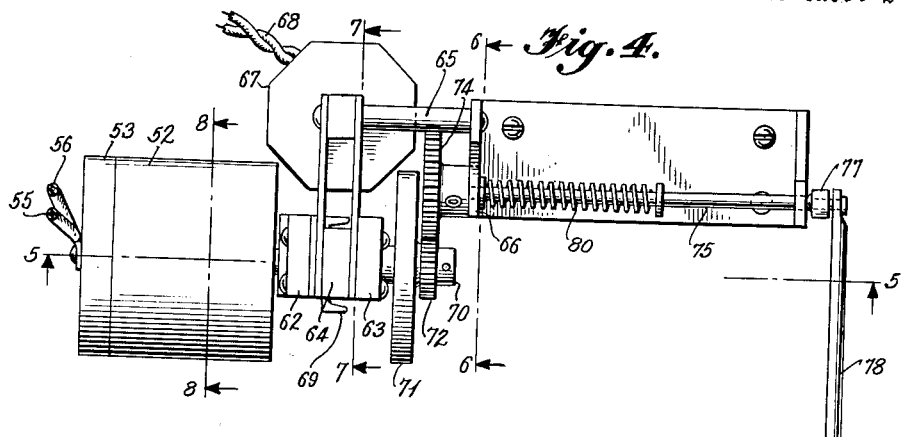
Figure 4 is a plan view of a modified form of the device of this invention.
Figure 5:
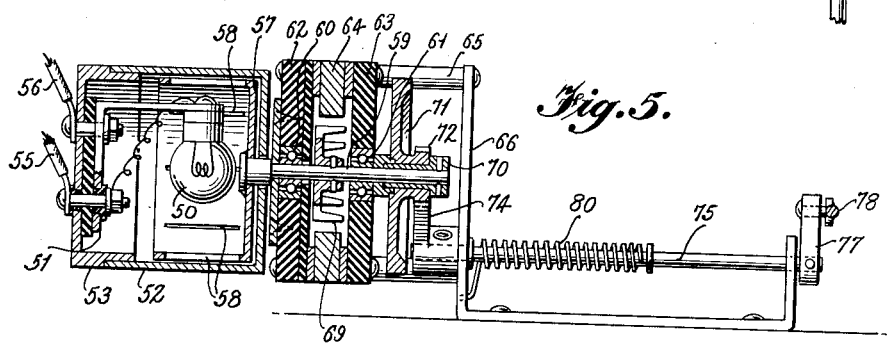
Figure 5 is an elevational view of Figure 4, partly in section and taken on the line 5—5 of Figure 4.

Referring now in greater detail to Figure 1, it will be noted that the oscillograph there shown is of the multiple string type in which a plurality of strings 10 are supported in parallel relation intermediate the pole pieces 11 of an electromagnet. Each of the strings is yieldably supported by means of a spring 12 so that each string, when energized, may vibrate transversely of the pole pieces 11 and generally in the plane in which the group of strings is disposed. A voltage is applied to the opposite ends of the strings 10 by connecting each of them to an amplifier, not shown, which in turn is connected to a seismometer. Thus, when the seismometers are energized the strings are caused to vibrate in the magnetic field between the pole pieces 11 to produce a plurality of shadow images which are susceptible of recording.

The recording of the shadow images is effected by the passage of light from a suitable source 15, through a lens 16, through slots 17 in the pole pieces 11, through a lens 18, and finally through a lens 19 onto a photographic film or tape 20 which is driven at a constant speed in the direction of the arrow of Figure 1 by means not shown. It is noted that the lens 18 is a projection lens and that the lens 19 is a condensing lens closely associated with the photographic paper 20.

It can now be seen that when the strings 10 are caused to oscillate, their shadows are caused to fall and be focused on the photographic film or tape 20, and upon the development of this strip, a negative is produced in which the background is dark and the record traces representative of the several signals are white.

Between the lenses 18 and 19 there is disposed a shutter device 21 which is driven from a synchronous motor 22 through a coupling constituting an important part of the present invention. The shutter 21 includes a plurality of radially extending spokes or blades 23 which, when the shutter is rotated, are successively interposed in the optical system so that they successively interrupt the light beam from the lamp 15 to the sensitized paper 20. The effect of the spokes or blades 23 is to produce, after the development of the photographic paper, a number of spaced lines extending laterally across the photographic paper, the space between the lines representing intervals of time.

It is quite apparent that instead of projecting shadows from string galvanometers and shadows from the blades of the timing shutter, it is equally possible to project light from mirror galvanometers and to provide a shutter having radial slots therein instead of radial blades to produce the timing lines. An example of a shutter of this type, which per se forms no part of the present invention, is to be found in Manzanera Patent No. 2,348,401.

Now referring to Figure 2 of the drawings, the reference numeral 30 represents the stator and field of the synchronous motor, and reference numeral 31 represents the rotor armature thereof. The armature is provided with a shaft 32 mounted in bearings 33, 34 and 35 for free rotation. On the shaft 32 between the bearing 34 and the bearing 35 there is provided a hub or enlarged cylindrical portion 36, over which a flywheel 37 is fitted. The flywheel, preferably, is so designed that it has a large moment of inertia compared with the rotor 31 of the synchronous motor. It is mounted loosely over the hub portion 36 of the shaft 32 and, during normal operation, is coupled to the rotor 31 only by the friction of the bearing between itself and the shaft. Thus, energy is stored in the flywheel 37 by means of the frictional coupling to the rotor, and this energy is returned to the rotor through the frictional coupling if the rotor should fall below the speed at which the system is rotating. Actually, the flywheel is free to spin on the shaft, but due to the frictional coupling it turns at the same speed as the shaft under normal conditions. However, as the motor tends to "hunt," the flywheel alternately absorbs energy and supplies energy through the frictional coupling between itself and the shaft, and thus damps out the "hunting." Accordingly, the high average accuracy which has characterized synchronous motors of this type prior to applicant's invention is retained, but high instantaneous accuracy is also achieved.

It is stated above that during normal operation of the timing device, the flywheel 37 is not connected except through the friction of its bearings to the shaft 32 of the motor. However, in starting a synchronous motor it is necessary that the rotor and the friction wheel or flywheel be started at the same time. While there are a number of ways in which this result can be accomplished, there is shown in Figures 2 and 3 a system involving a centrifugal frictional clutch which establishes a driving connection between the shaft 32 and the flywheel 37 during starting operations, and while the motor is being accelerated to speed. To this end a disc 40 is keyed at 41 to the shaft 32 and there are mounted on the disc 40 a plurality of bell cranks 42, each provided with a weight 43 on one arm and a brake shoe 44 on the other. A spring 45 normally urges the brake shoe to an outwardly extending position. However, when the disc 40 is rotated at predetermined speeds, the effect of centrifugal force on the weights 43 is such as to cause reaction inwardly of the brake shoes 44. Cooperating with the brake shoes 44 there is provided a flange 46 extending to the left of the flywheel 37 as it is shown in Figure 2. The flange 46 affords a surface against which the brake shoes 44 can, and do, act during the periods that the disc 40 and the flywheel 37 are rigidly connected together to rotate as a unit. Inasmuch as it is important that the timing spokes be rigidly attached to the rotor shaft of the motor, it is convenient to attach the spokes 23 to the disc 40, although if desired, they may be otherwise attached for rotation with the shaft 32.

To start the motor, the flywheel is spun by hand or any convenient mechanical means and, through the friction clutch, turns the rotor of the motor. This movement is continued until the flywheel has turned the shaft 32 at the proper speed for the motor to drop into synchronism. At this point the motor starts, and at or near this point the shoes 44 have moved out of engagement with the flange 36 or flywheel 37 so that the flywheel is connected to the shaft only by friction. The flywheel damps out the "hunting" resulting from the system dropping into synchronism. Formerly, this "hunting" was frequently violent enough and sustained enough so that the "hunt" persisted as the system lost speed and eventually a condition would be reached where the system would be turning below synchronous speed and one of the "hunting" cycles would throw it out of step and thus stop the system.

In Figure 2 there are indicated diagrammatically a collar 38 which is attached to the shaft 32 and a flange 39 which is attached to the flywheel 37. The flange 39 extends between the hub 36 and the collar 38 and acts to prevent axial movement of the flywheel 37. It will be understood, of course, that these bearings are merely examples of apparatus which can be used for the purpose of maintaining the flywheel in its predetermined axial position on the shaft 32.

While the frictional drive between the flywheel and the motor is illustrated as constituting nothing more than the bearing engagement of the hub 36 with the flywheel 37, it is to be understood that this frictional coupling can be effected in a number of ways. For example, the flywheel could be mounted on an anti-friction bearing and the friction between it and the rotor shaft could be adjustably applied by a spring-loaded brake. Hydraulic or magnetic couplings could also be used.

The friction clutch for selectively disengaging the flywheel from positive rotation with the shaft 32 is also susceptible of replacement by equivalent means for accomplishing the same result.

While the foregoing invention has been described with respect to a timing motor used in driving the shutter in a multiple oscillograph system, it is apparent that the invention is of wide general utility to timing motors and to installations where the instantaneous motor speed must be maintained at some exact value.

The modification of this invention illustrated in Figures 4 to 8, inclusive, has already been embodied in a practical seismograph system. In this system one of the equipment units is made to include a multi-element mirror galvanometer, a light source therefor, a photographic paper magazine, constant speed driving means therefor and the necessary lens system for recording the light traces resulting from the light source and the mirror galvanometer elements, upon photographic paper in the magazine. This unit also incorporates the timing line generator, illustrated in Figures 4 to 8, a constant frequency vibrator power supply for this timing line generator and the necessary additional lens system to place the timing lines generated by this timing line generator on the photographic paper transversely of the paper and in the desired relation to the galvanometer traces.

The fixed frequency vibrator power supply for the timing line generator of this invention is of the tuning fork-carbon button type, which is generally known and is, therefore, not here described in detail. Any other type of fixed frequency generator could be utilized in its stead.

The lens system consists simply in the necessary lenses and mirrors to transmit and focus the light from the timing line generator on the moving tape and, therefore, is likewise omitted from this description.

Figure 8:
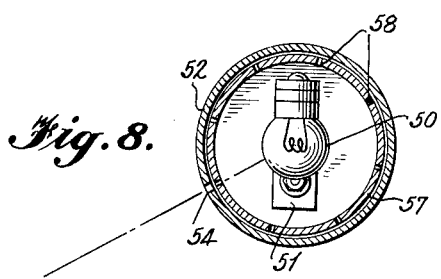
Figure 8 is an end elevational view, in section, of the device shown in Figure 4 and taken on the line 8—8 of Figure 4.

In accordance with Figures 4 to 8, light for the timing lines is generated by an electric light bulb 50 supported on a bracket 51 in a housing which consists of a cylindrical can 52 closed at one end by a cap 53. In the can 52 is a single elongated slot 54 as shown in Figure 8. The electric light bulb 50 is supplied with operating power through a pair of wires 55 and 56 from a suitable source not shown.

Inside of the can 52 is a cup-shaped member 57 which surrounds the bulb 50 and prevents light from this bulb from passing outward to the slot 54 in the can 52. The cup-shaped member 57, however, is provided with a series of elongated slots 58 which, as the coup is rotated, register periodically with the slot 54 in the can 52, thus momentarily allowing the escape of a beam of light of relatively long narrow cross-section.

In order that the cup-shaped member 57 may be rotated, it is mounted, fixedly, on the end of a shaft 59 which passes freely through the end of the can 52 and is mounted for rotation outside of the can 52 in ball bearings 60 and 61. The cup-shaped member 57 is of such a size that it will fit inside of the can 52 and rotate freely therein but its external dimensions are near enough the internal dimensions of the can so that it fits relatively closely in the can and thus prevents the escape of any appreciable amount of stray light.

The ball bearings 60 and 61 are mounted respectively in, and frame, members 62 and 63 of a small synchronous motor. These frame members are supported by being bolted to the core 64 of a field magnet for the motor and this core is in turn supported by bolts and sleeves 65 from a frame member 66 attached to the frame of the recording oscillograph with which the device is to be used. Suitable spacers are placed between the frame members of the motor and the field magnet core 64 and between the light can and the adjacent frame member. Field windings 67 are provided for the field magnet and are supplied with current through leads 68 from a source of fixed frequency alternating current not shown.

Mounted upon the shaft 59, and rigidly fixed thereto, between the frame members and between the pole pieces of the field magnet is an induction rotor 69 of the type commonly used in synchronous motors. Thus, once the shaft 61 has been brought up to synchronous speed and power supplied to the field magnet windings 67, the armature 69 will rotate at synchronous speed and carry with it the shaft 59.

In order to start the shaft 59 rotating and also to prevent it from hunting during rotation, the shaft 59 is extended beyond the frame member 63 and provided with a bushing 70, fixed to this extension of the shaft, and carrying on its outer surface a small fly wheel 71. Formed integrally with this fly wheel 71 is a small spur gear 72 adapted to cooperate with a segmental gear 74 during the starting operation and thereafter to rotate freely with the flywheel 71, completely out of contact with the segmental gear 74.

Segmental gear 74 is in turn mounted on the end of a rotatable starting shaft 75 journaled in the frame member 66 and carrying at its opposite end a crank member 77 pivotally connected to a starting rod 78 which passes to the front of the device of which the timing line generator is a part and there terminates in a knob, not shown, which can be pulled and released to start the timing motor.

Figure 6:
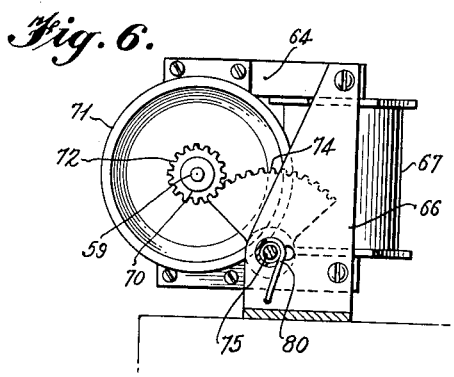
Figure 6 is an end elevational view, in section, of the device shown in Figure 4 and taken on the line 6—6 of Figure 4.
Figure 7:
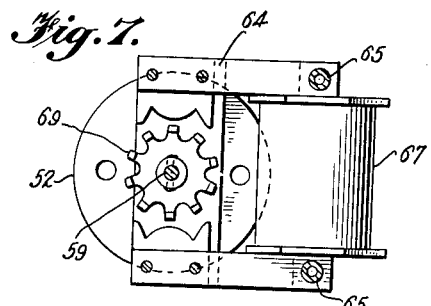
Figure 7 is an end elevational view, in section, of the device of Figure 4 taken on the line 7—7 of Figure 4.

Around the starter shaft 75 is mounted a coil spring 80 and one end of this coil spring is connected to the starter rod and the other to the frame member 66 at a point adjacent and below the point at which the starter rod 75 is journaled in the frame 66, at the end next to the segmental gear. As the operating rod 78 is pulled, this spring is wound and the segmental gear 74 is rotated in a counter-clockwise direction (as seen in Figure 6). When the operating rod is released, the spring 80 rotates the starter shaft 75 and the segmental gear 74, clockwise (as seen in Figure 6), until the segmental gear 74 is completely out of contact with the spur gear 72 on the flywheel. This rotation spins the spur gear 75 and with it the flywheel 71 and they, through frictional contact with the bushing 70 on the shaft 59, spin the shaft 59 and start the synchronous motor in operation. Thereafter the flywheel 71, through its frictional connection with the shaft 59 serves to prevent hunting.

In order that there be no difficulty about the meshing of the segmental gear 74 and the spur gear 72, the journal for the starter shaft 75, where it passes through the frame 66 adjacent the segmental gear 74, is in the form of a short horizontally extending slot. The action of the spring 80 tends to push the segmental gear 74 and the spur gear 72 into mesh and to keep the starting shaft 75 at the end of its journal slot closest to the spur gear. However, as the gears originally contact, the shaft 75 moves in the slot to prevent jamming of the gear teeth.

With a device as illustrated in Figures 4 to 8, inclusive, the starting and the operation of the timing line device becomes a simple matter of turning on the power supply for the light bulb and motor and the pulling and releasing of the starter operating rod 78.

The can that comprises the major part of the housing for the electric bulb 50 may be rotated as desired to adjust the position of the timing line as it is sent to the lens system, and then clamped in that position. No clamping means are shown, but any type of clamping means may be provided for clamping this can 52 either to the oscillograph upon which the device is mounted or to the timing motor frame.

What is claimed is:

1. A seismograph timing device that comprises in combination a light source, a revolving shutter arranged to cooperate with said light source to place timing lines on the seismograph record, a synchronous motor directly connected to said shutter so as to drive said shutter, a fly-wheel rotatably mounted on the shaft of said synchronous motor said fly-wheel being completely free to rotate with respect to said motor shaft but having appreciable frictional engagement therewith, and means to spin said fly-wheel to start said synchronous motor and shutter.

2. A seismograph timing device that comprises in combination a light source, a revolving shutter arranged to cooperate with said light source to place timing lines on the seismograph record, a synhcronous motor directly connected to said shutter so as to drive said shutter, a fly-wheel rotatably mounted on the shaft of said synchronous motor said fly-wheel being completely free to rotate with respect to said motor shaft but having appreciable frictional engagement therewith, and manually-operable means to spin said fly-wheel to start the motor and shutter.

3. A device as defined in claim 2 in which the manually-operable means to spin the fly-wheel comprises a spur gear on the fly-wheel, a segmental gear positioned so that it can engage said spur gear, a spring connected to urge said segmental gear into engagement with said spur gear and to rotate said segmental gear to spin said fly-wheel and finally to remove said segmental gear from engagement with said spur gear, and manually-operable means to rotate said segmental gear against said spring to wind said spring.

4. A synchronous motor, a fly-wheel rotatably mounted on the shaft of said synchronous motor and free to rotate with respect to said motor shaft but having appreciable frictional engagement therewith, and means to spin said fly-wheel to start said synchronous motor.

References Cited in the file of this patent

UNITED STATES PATENTS

| Number | Name | Date |
|---|---|---|
| 653,424 | Lunt | July 10, 1900 |
| 707,389 | Churchward | Aug. 19, 1902 |
| 707,390 | Churchward | Aug. 19, 1902 |
| 727,411 | McBerty | May 5, 1903 |
| 741,290 | Wood | Oct. 13, 1903 |
| 1,065,489 | Wood et al. | June 24, 1913 |
| 1,106,156 | Ogg | Aug. 4, 1914 |
| 1,271,362 | Rainey | July 2, 1918 |
| 1,796,649 | Hammond | Mar. 17, 1931 |
| 1,930,289 | Spear | Oct. 10, 1933 |
| 1,936,932 | Brower | Nov. 28, 1933 |
| 1,968,804 | Arden | Aug. 7, 1934 |
| 2,003,116 | Hammond | May 28, 1935 |
| 2,348,401 | Manzanera | May 9, 1944 |

FOREIGN PATENTS

| Number | Country | Date |
|---|---|---|
| 363,136 | Great Britain | Dec. 17, 1931 |
| 386,756 | Great Britain | Jan. 26, 1933 |
| 462,660 | Great Britain | Mar. 8, 1937 |